June 1, 1937.　　　F. H. GULLIKSEN　　　2,081,995
REGULATING SYSTEM
Filed July 16, 1935
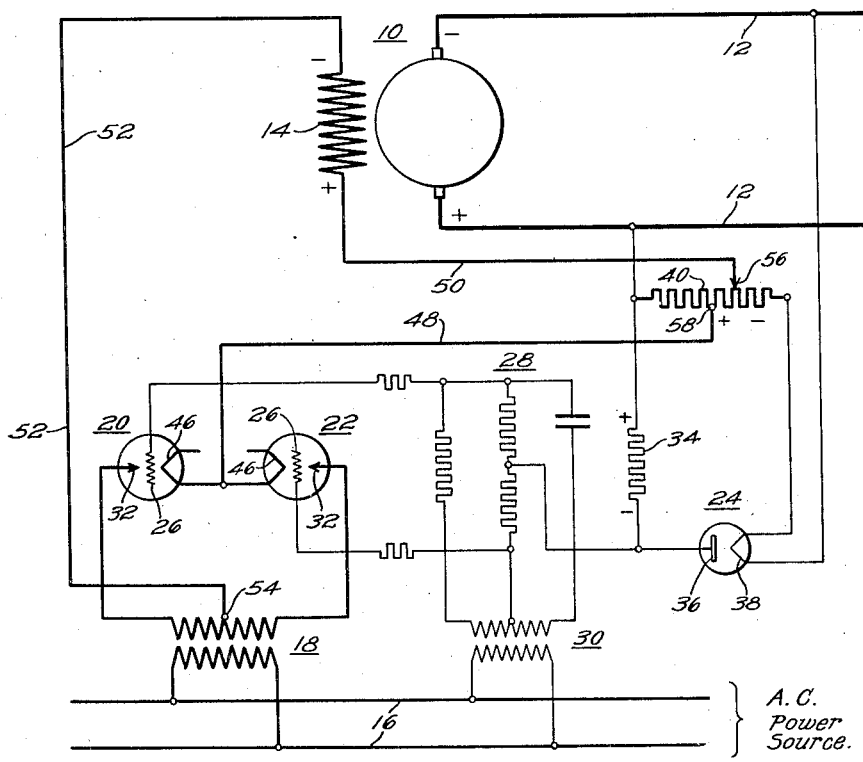
WITNESSES:
C. J. Weller.
C. F. Bryant
INVENTOR
Finn H. Gulliksen.
BY Ezra W. Savage
ATTORNEY Patented June 1, 1937

2,081,995

UNITED STATES PATENT OFFICE 2,081,995

REGULATING SYSTEM

Finn H. Gulliksen, Wilkinsburg, Pa., assignor to Westinghouse Electric & Manufacturing Company, East Pittsburgh, Pa., a corporation of Pennsylvania Application July 16, 1935, Serial No. 31,628

6 Claims. (Cl. 171—312)

My invention relates to electrical regulators and it has particular relation to electronic tube regulating systems for maintaining constant the voltage or other characteristic of a direct-current generator, machine or circuit.

Generally stated, the object of my invention is to simplify and reduce the expense of the equipment and control circuits comprised by regulators of the above defined class.

Another object is to provide an inexpensive regulator which combines high sensitivity, quick response and other desirable performance characteristics.

An additional object is to provide an improved form of load compensating means for direct current voltage regulators.

My invention, together with additional objects and advantages, will best be understood through the following description of a specific embodiment thereof when taken in conjunction with the accompanying drawing in which the single figure is a diagrammatic representation of one preferred form of my new regulating system shown as being applied to control the voltage of a direct-current generator.

Referring to the drawing, the regulating system there depicted functions to regulate the voltage of a direct-current generator 10, the armature winding of which is directly connected with the conductors 12 of an output circuit. The generator field winding 14 derives its exciting current from a suitable source of alternating-current power 16 through a connection which includes a transformer 18 and a pair of rectifier tubes 20 and 22.

The effective current passed by these tubes, which preferably are of the grid-controlled gas-filled variety and which are connected in well known manner to effect full wave rectification, is controlled by a grid voltage supply circuit which includes a detector tube 24 influenced by a measure of the voltage of the regulated circuit 12.

To facilitate the control of rectifier tubes 20 and 22, I supply to the grid elements 26 thereof, through the medium of a phase shifting bridge circuit 28 energized from power source 16 through a transformer 30, a wave of control voltage which is fixedly displaced from that impressed upon the tube anodes 32. I then superimpose upon this wave of grid voltage the direct-current potential appearing across a resistor 34 connected in the manner shown in the circuit through which the anode element 36 of the detector 24 is maintained, by the voltage of regulated circuit 12, at a positive potential with respect to the filamentary cathode 38.

The mentioned cathode 38 of the two element detector tube is also energized by a measure of the voltage of regulated circuit 12 through a circuit which includes a resistor 40. The anode voltage of this tube is preferably of a value sufficiently high to saturate or place the tube in a condition in which all of the electrons emitted by the cathode are attracted to the anode. Under such a condition, a change in the magnitude of the cathode heating voltage effects a much greater change in the current which the tube passes through resistor 34, the degree of amplification being of the general order of six or more to one. Such a detector is, therefore, exceedingly sensitive and when connected in the manner shown eliminates the necessity for the source of reference voltage which previously has been required to obtain high regulatory precision.

In the particular connection illustrated, in which the cathodes 46 of these tubes are connected by means of conductors 48 and 50 with the lower end of field winding 14 and the upper end of this winding is connected by means of conductor 52 with the midtap 54 on the secondary winding of transformer 18 and thence through the two halves of this winding to the tube anodes 32, the lower end of the field winding 14 is maintained at a positive potential with respect to the upper end.

In operation of the complete regulating system, as long as the magnitude of the voltage supplied by generator 10 to the regulated circuit 12 is of the normal or desired value, the cathode 38 of detector tube 24 is heated to an intermediate temperature which causes the control voltage impressed upon the grids of the excitation supply tubes 20 and 22 to be of such character that they supply to the generator field winding 14 the value of exciting current proper to maintain this voltage.

Upon the occasion of a decrease in this regulated voltage, the potential impressed upon the detector cathode correspondingly decreases and the detector passes through resistor 34 a smaller value of anode current. The resulting decrease in voltage drop across this resistor, acting in combination with the displaced wave of grid potential supplied through bridge 28, causes the grids 26 to institute conductivity at an earlier point in the positive half cycles of anode voltage supplied to tubes 20 and 22. In consequence, these tubes increase the magnitude of current supplied to machine field winding 14, and, therefore, restore the voltage of generator 10 back to its desired value.

In a similar manner upon the occasion of a rise in the voltage of the regulated circuit 12, the temperature of detector cathode 38 is increased, the voltage drop across resistor 34 raised and the grid potential of tubes 20 and 22 so modified as to lower the exciting current passed thereby to thus restore the voltage of machine 10 back to its desired value.

I have discovered that the system just described is inherently stable in operation and exhibits no tendency to hunt or overshoot in its corrective actions. It has a high speed of response and requires very little time to settle disturbances in the regulated voltage. Its simplicity and ruggedness impart to it a highly practical nature.

The described regulator has the usual slight inherent drooping characteristic common to all systems of similar character. In my new system, however, this may readily be overcome, as when it is desired to produce a flat characteristic, through the utilization of load-compensating means, one preferred form of which comprises the before-mentioned potentiometer resistor 40 connected in the manner shown to be common to the generator excitation supply circuit and to the circuit through which the detector 24 is influenced by the regulated voltage.

When, as illustrated, a compensation adjusting tap 56 occupies a position to the right of a midtap connection 58 along this resistor there will be induced in that portion of the resistor between these two points a voltage drop which is proportional to the machine exciting current and which subtracts from the voltage of circuit 12 in the detector cathode supply circuit. Since as the load on the regulated machine is increased, greater excitation is required to maintain the voltage at a substantially constant value, this resistor 40 causes the voltage of circuit 12 to be maintained above the measure of that which is impressed upon the cathode 38 of the detector, which latter voltage the regulator functions to maintain constant, by an amount proportional to the machine load.

The magnitude of this resulting rising characteristic may be increased by advancing the tap 56 further to the right and lowered by moving the tap in the opposite direction. When the tap occupies a position to the left of point 58, along the resistor, the regulator will have imparted to it an amplified drooping-voltage-with-machine-load characteristics.

Although I have shown and described a certain specific embodiment of my invention, I am fully aware that many modifications thereof are possible. My invention, therefore, is not to be restricted except insofar as is necessitated by the prior art and by the scope of the appended claims.

I claim as my invention:

1. A voltage-regulating system for an electrical generator having a field winding comprising a source of alternating-current power, a gas-filled electronic tube having a grid element and anode and cathode elements connected intermediate said field winding and said power source, means for influencing said grid by a wave of control voltage of displaced phase relation with respect to the power source voltage, a detector tube having an anode and a filamentary cathode, a circuit, including an impedor, for maintaining said anode at a positive potential with respect to said cathode, means for superimposing upon said control-voltage wave the voltage-drop across said impedor, and means for energizing said cathode by a measure of the voltage of said generator.

2. A voltage-regulating system for a direct-current generator having a field winding comprising a source of alternating-current power, a grid-controlled gas-filled electronic tube having anode and cathode elements connected intermediate said field winding and said power source, means for impressing upon the grid of said tube a wave of control voltage of displaced phase relation with respect to the power-source voltage, a detector tube having an anode and a filamentary cathode, a circuit energized by the generator voltage and including an impedor for maintaining said detector anode at a positive potential with respect to said cathode, means for super-imposing upon the afore-mentioned control-voltage wave the voltage drop across said impedor, and means for energizing said detector cathode by a measure of the generator voltage.

3. In a system comprising a direct-current generator having a field winding, a circuit for supplying an exciting current to said winding, and a regulator, including a detector tube having an anode and a filamentary cathode, adapted to adjust the magnitude of said current, the combination of a circuit for energizing said cathode by a measure of the generator voltage, an impedor included in said circuit, means for circulating through a portion of said impedor a measure of the generator field winding current to thereby modify the voltage impressed by the generator upon the detector cathode in accordance with changes in said current, and means for changing the magnitude of said impedor portion and the direction of field current flow therethrough.

4. In a system comprising a direct-current generator having a field winding, a circuit for supplying an exciting current to said winding, and a regulator, including a detector tube having an anode and a filamentary cathode, adapted to adjust the magnitude of said current, the combination of a circuit for energizing said cathode by a measure of the generator voltage, an impedor included in said circuit, and means for circulating through said impedor a measure of the generator field winding current to thereby modify the voltage impressed by the generator upon the detector cathode in accordance with changes in said current, the above-recited connections being such that the regulator has imparted to it a rising-voltage-with-generator-load characteristic.

5. In a system comprising a direct-current generator having a field winding, a circuit for supplying an exciting current to said winding, and a regulator, including a detector tube having an anode and a filamentary cathode, adapted to adjust the magnitude of said current, the combination of a circuit for energizing said cathode by a measure of the generator voltage, an impedor included in said circuit, and means for circulating through said impedor a measure of the generator field winding current to thereby modify the voltage impressed by the generator upon the detector cathode in accordance with changes in said current, the above-recited connections being such that the regulator has imparted to it a drooping-voltage-with-generator-load characteristic.

6. A regulator for controlling the voltage of an electrical generator comprising a circuit, including a grid-controlled gas-filled electronic tube, through which generator exciting current may be supplied from a source of alternating-current power, means adapted to impress upon the grid of said tube a wave of control voltage of displaced phase relation with respect to the voltage of said power source, a detector tube having an anode and a filamentary cathode, a circuit, including an impedor, adapted to maintain said anode at a positive potential with respect to said cathode, means adapted to superimpose upon the aforementioned control-voltage wave the voltage drop across said impedor, and means adapted to energize said detector cathode by a measure of the generator voltage.

FINN H. GULLIKSEN.